A. F. KOERBER.
COLLAPSIBLE WINDOW FRAME FOR VEHICLE BODIES.
APPLICATION FILED SEPT. 2, 1914.
1,157,875.
Patented Oct. 26, 1915.
2 SHEETS—SHEET 1.
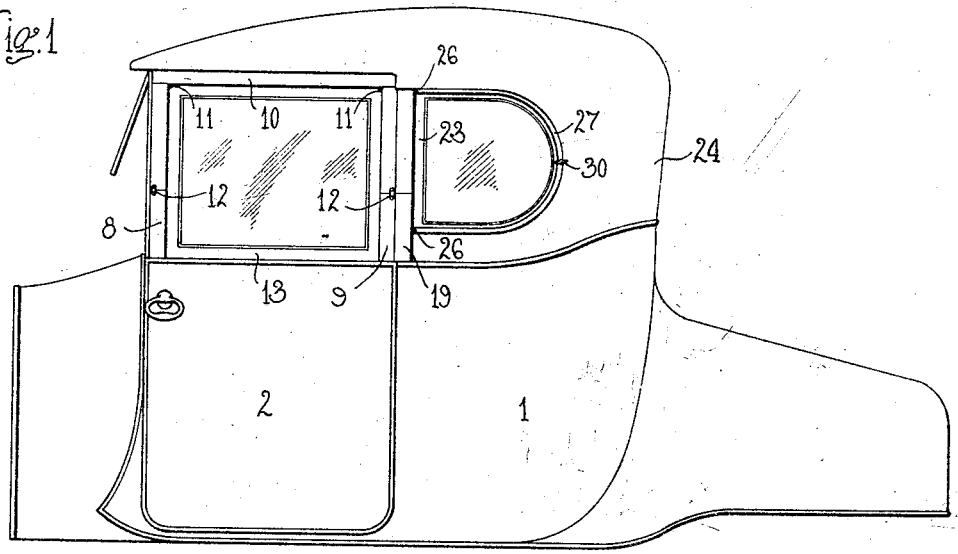
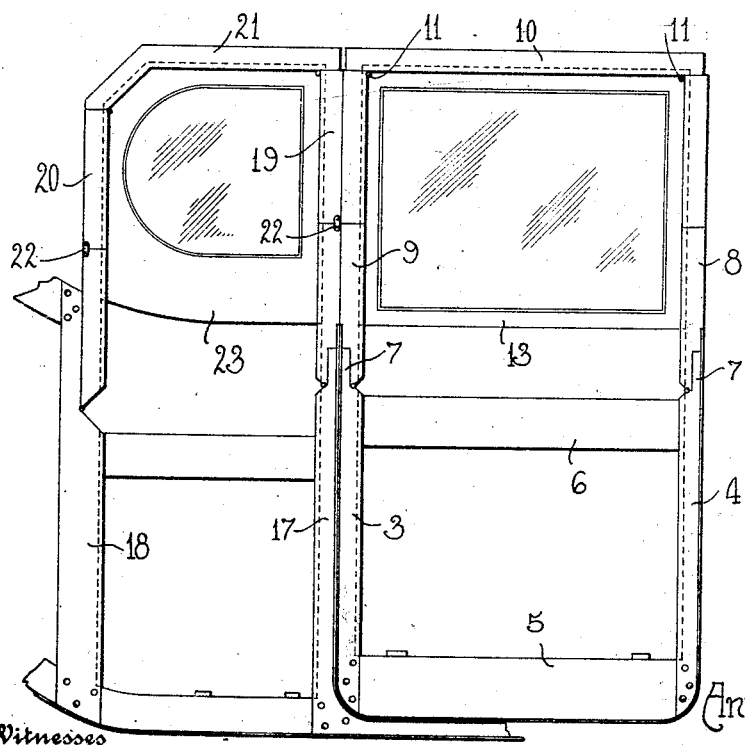

A. F. KOERBER.
COLLAPSIBLE WINDOW FRAME FOR VEHICLE BODIES.
APPLICATION FILED SEPT. 2, 1914.
1,157,875.
Patented Oct. 26, 1915.
2 SHEETS—SHEET 2.
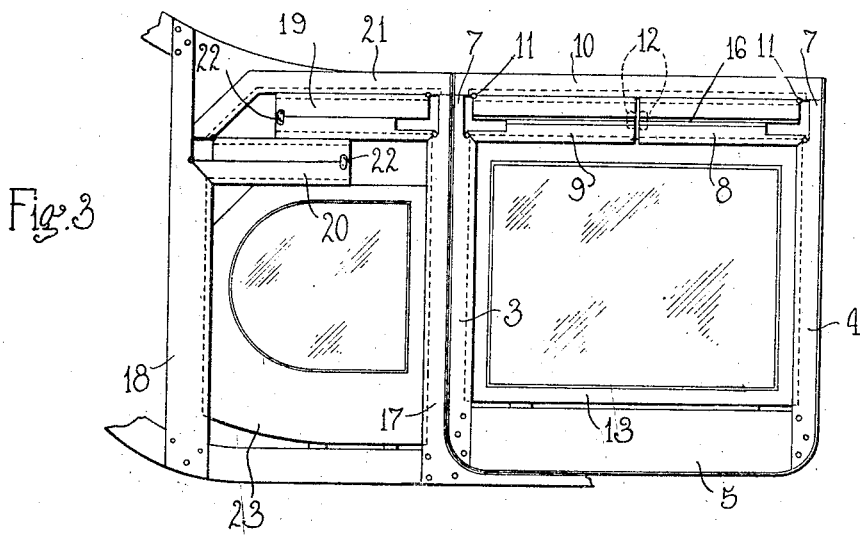
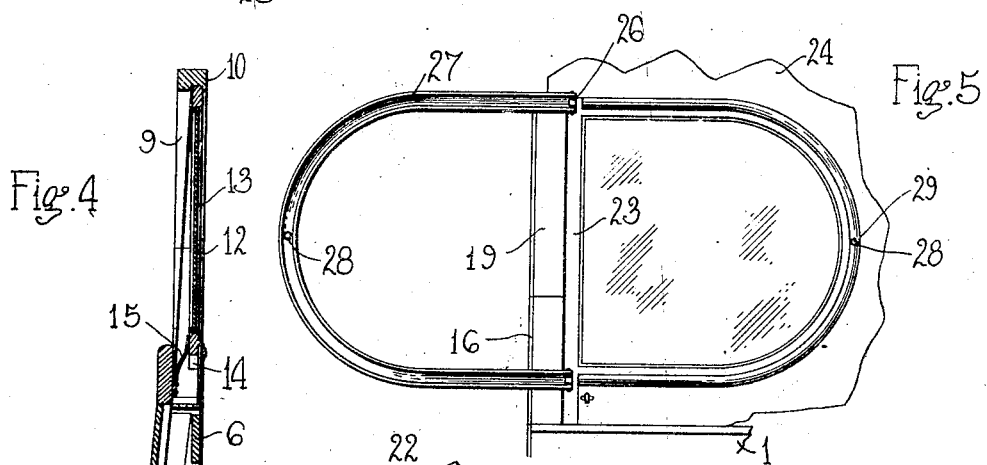
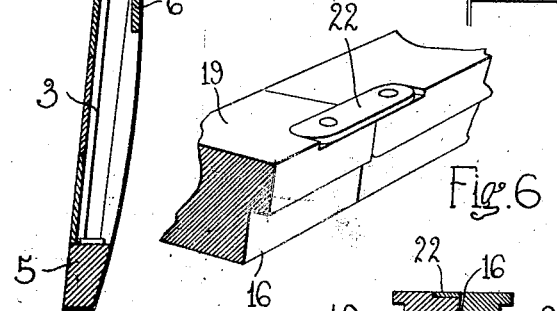
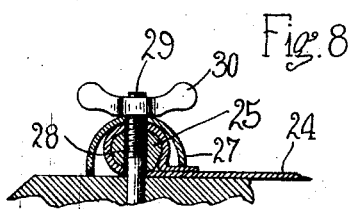
Inventor
Antony F. Koerber

UNITED STATES PATENT OFFICE.

ANTHONY F. KOERBER, OF DETROIT, MICHIGAN.

COLLAPSIBLE WINDOW-FRAME FOR VEHICLE-BODIES.

1,157,875.  Specification of Letters Patent.  Patented Oct. 26, 1915.

Application filed September 2, 1914. Serial No. 859,754.

*To all whom it may concern:*

Be it known that I, ANTHONY F. KOERBER, a citizen of the United States of America, residing at Detroit, in the county of Wayne and State of Michigan, have invented certain new and useful Improvements in Collapsible Window-Frames for Vehicle-Bodies, of which the following is a specification, reference being had therein to the accompanying drawings.

This invention relates to collapsible window frames for the bodies of automobiles and similar vehicles, and more particularly to that type of automobile that has a convertible body and collapsible top provided with sashes, transparent plates, or panels for admitting light through a closed body or extended top.

The primary object of my invention is to furnish a vehicle body with novel collapsible window frames that have been especially designed for use in connection with a collapsible top, to obviate the necessity of using isinglass or similar panels in connection with the top.

Another object of this invention is to provide a vehicle body with shiftable transparent sashes or panels to one of which a top or canopy can be easily and quickly connected, thus permitting of a roadster or open body being easily and quickly converted to a closed body.

A further object of this invention is to furnish a vehicle body with novel window frames that can be readily collapsed and housed within the side walls of the body, and just as readily extended to receive window sashes that are also housed within the walls of the body when not in use.

In accomplishing the above results, the parts are constructed with a view of reducing the cost of manufacture and at the same time retain the features by which safety, durability, simplicity and ease of assembling are secured, and with such ends in view, my invention consists in the novel construction, combination and arrangement of parts to be hereinafter specifically described and then claimed.

Reference will now be had to the drawings, wherein—

Figure 1 is a side elevation of an automobile body equipped with my improvement and showing the top of the automobile raised or extended; Fig. 2 is an elevation of the inner side of a portion of the automobile body, showing the collapsible window frames in a raised or extended position; Fig. 3 is a similar view showing the window sashes and frames housed within the wall of the body; Fig. 4 is a vertical sectional view of a window frame in a raised and extended position; Fig. 5 is a side elevation of a portion of a window sash, showing the top or curtain holding means in an open position; Fig. 6 is an enlarged perspective view of a portion of the window frame, illustrating one type of hinge for the sections thereof; Fig. 7 is an enlarged cross sectional view of adjoining frames, and Fig. 8 is an enlarged horizontal sectional view illustrating a fastening device for the curtain holding means on one of the window sashes.

In describing my invention by aid of the views above referred to, I desire to point out that I intend the same as merely illustrative of an example whereby my invention may be applied in practice, and I do not care to limit myself to the precise construction and arrangement of parts shown. The following description is therefore to be broadly construed as including substitute arrangements and constructions which are the obvious equivalents of those to be hereinafter referred to.

In Fig. 1 there is depicted the well known "Paige" car body as an example of that type to which my improvements are applicable, the body being generally designated 1 and having a door 2 at each side thereof. The side walls of the door 2 include vertical parallel stiles 3 and 4 connected by transverse frames 5 and 6, these elements being housed by the inner and outer finishing panels or walls of the door. The stiles 3 and 4 terminate below the upper edge of the walls of the door and are cut away to provide supports 7. These stiles are stationary and hinged or otherwise pivotally connected to the stiles 3 and 4, at the cut away upper ends thereof, are sectional movable stiles 8 and 9 connected by a top rail 10, which has the ends thereof hinged or pivotally connected, as at 11 to the upper sections of the vertically disposed stiles 8 and 9. The lower sections of the stiles 8 and 9 have the lower hinged ends thereof cut away to rest upon the vertical supports 7, said supports limiting the opening movement of said stiles. The sections of the stiles 8 and 9 are hinged, as at 12 whereby the lower sections can be swung inwardly to a horizontal plane, as shown in Fig. 3 and the upper sections folded outwardly thereon, the sections of said stiles remaining in parallelism with the top rail 10 upon the inner sides of the upper sections of the stiles 8 and 9.

The stationary stiles 3 and 4 accommodate a window sash 13 and with the stiles 8 and 9 extended, as shown in Fig. 2, the sash 13 can be shifted or raised from the stiles 3 and 4 to within the frame formed by the stiles 8 and 9 and the top rail 10. The window sash 13 is constructed somewhat upon the principle of the sash of a street car window. That is, after being raised the lower edge thereof is laterally shifted to supports 14 and retained thereon by small flat compression springs 15 or similar means for preventing accidental displacement of the raised window sash.

The structure just described is that of the door 2 which is hinged in the ordinary and well known manner to the body 1, and in order that said door can be properly fitted, the stiles 3, 4, 8 and 9 have the outer edges thereof rabbeted as at 16.

The body of the vehicle is constructed somewhat upon the same principle as the door 2 and has stiles or guideways 17 and 18, the former of greater height than the latter and both terminating below the upper edge of the body. Hinged or otherwise pivotally connected to the upper ends of the stiles 17 and 18 are foldable stiles 19 and 20 respectively having the upper ends thereof hinged to a top rail 21. The foldable stiles 19 and 20 are composed of two sections hinged together by straps 22, as best shown in Fig. 6 and the stile 19 rabbeted to receive the stile 9 of the door, while the stile 17 is rabbeted to receive the stile 3 of the door. The stiles of the body are adapted to receive a window sash 23 which can be retained in an elevated position in a manner similar to the sash 13 of the door. It is to the window sash 23 that a portion of a canopy or vehicle top 24 is connected and novel means is employed for holding the marginal edges of the top at the edges of the sight opening of the window sash 23. The means resorted to is best shown in Figs. 5 and 8 and it will be observed that the marginal edges of the canopy or top 24 terminate in a roll 25. This roll can be formed by a case, at the marginal edges of the canopy or top, stuffed with felt or other compressible material.

Hinged or otherwise connected to the window sash 23, as at 26 is a channel shaped frame, that is C shaped in elevation although the shape of the same entirely depends upon the shape of the sight opening of the sash 23. The channel frame 27 is adapted to fit over the roll 25 of the canopy or top 24 and retain the marginal edges of the canopy or top around the edges of the sight opening of the window sash 23, whereby the canopy or top will have practically the same appearance as though the sash 23 was permanently attached thereto.

To retain the frame 27 in a closed position said frame and the roll 25 have openings 28 adapted to register and receive a stud bolt 29 carried by the sash 23. A winged thumb nut 30 can be screwed upon the bolt 29 to retain the frame 27 upon the roll 25 and the canopy or top taut or extended. The elements 25 to 30 inclusive simply constitute a fastener for the fabric of the vehicle top. The sashes 13 and 23 are provided with plate window glass and these sashes can be easily lowered into the side walls or panels of the body 1 and the door 2. When in a lowered position, the stiles and rails constituting the window frames, can be folded or collapsed upon the upper edges of the sashes and with the canopy or top 24 lowered the car or vehicle can scarcely be distinguished from a roadster model.

What I claim is:—

1. The combination with a vehicle body and a top having side openings, of collapsible window frames foldable into the side walls of said body, window sashes in the side walls of said body adapted to be raised into said window frames when extended, and hinged frames carried by some of said sashes and adapted to engage the marginal edges of the top side openings for connecting said top thereto.

2. The combination with a vehicle body having a top, of stiles in the side walls of said body, window sashes movable in said stiles, collapsible window frames connected to the upper ends of said stiles and adapted to be folded within the walls of said body and upon the upper edges of said sashes, and fasteners carried by some of said sashes for connecting said top thereto when said sashes are raised.

3. The combination with a vehicle body having side doors and a collapsible top, of window sashes movable in the walls of said body and said doors, collapsible window frames foldable within said body and the doors thereof and adapted to be extended to receive said sashes, and fasteners carried by the sashes of said body and adapted to hold said top in engagement therewith.

4. The combination with a vehicle body having a top with the rear portion thereof provided with sight openings, of window sashes housed thereby and adapted to be extended above said body, and hinged frames carried by said window sashes and adapted to engage said top around the sight openings thereof.

5. The combination with a vehicle body having a top, of sashes movable in said body, window frames foldable therein and adapted to be extended to receive said sashes, and fasteners carried by said sashes and adapted to retain said top in engagement with said window sashes.

6. The combination with a vehicle body having a top, of a sash movable in and out of said body, and a channel shaped fastener connected to said sash and adapted to engage the marginal edges of said top to retain said top in engagement therewith when said sash is raised relative to said body.

7. The combination with a vehicle body having a top with the marginal edges thereof rolled, of window sashes movable in and out of said body, channel shaped fasteners carried by said window sashes and adapted to fit over the rolled marginal edges of said top to retain said top in engagement therewith when said sashes are raised.

In testimony whereof I affix my signature in presence of two witnesses.

ANTHONY F. KOERBER.

Witnesses:
KARL H. BUTLER,
GENEVIEVE E. MCGRANN.